Figure 1:
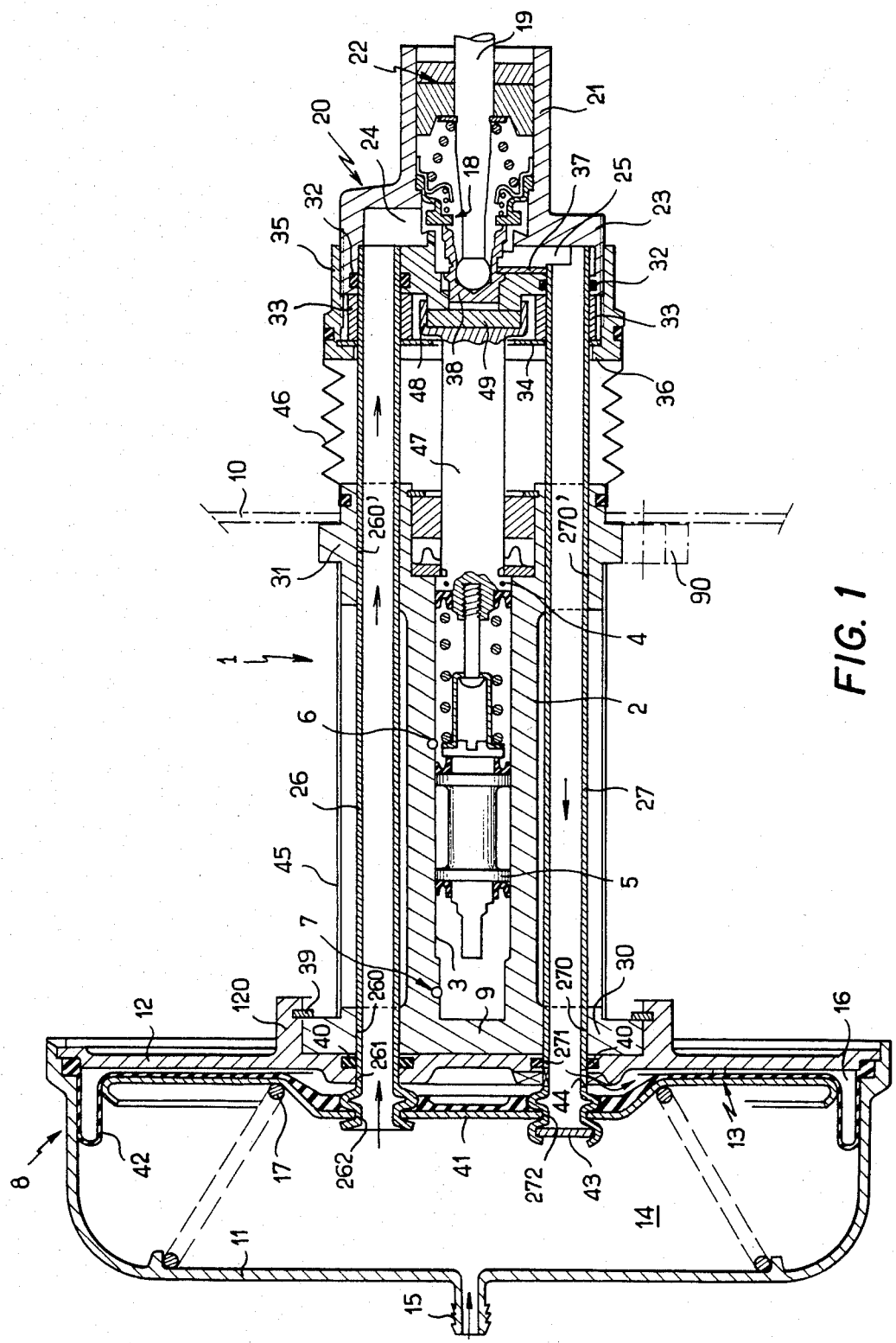

United States Patent [19]

Meynier

[11] Patent Number: 4,534,170
[45] Date of Patent: Aug. 13, 1985

[54] BRAKE-PRESSURE GENERATOR SYSTEM

[75] Inventor: Guy Meynier, Aulnay sur Bois, France

[73] Assignee: Societe Anonyme D. B. A., Paris, France

[21] Appl. No.: 560,684

[22] Filed: Dec. 12, 1983

[30] Foreign Application Priority Data

Dec. 23, 1982 [FR] France ............................... 82 21685

[51] Int. Cl.³ ............................................. B60T 13/00
[52] U.S. Cl. .................................. 60/547.1; 60/554; 60/562
[58] Field of Search ..................... 60/547.1, 554, 562; 92/165 PR, 166

[56] References Cited

U.S. PATENT DOCUMENTS

| 2,957,454 | 10/1960 | Stelzer | 121/41 |
| 3,408,815 | 11/1968 | Stelzer | 60/546 |
| 4,418,613 | 12/1983 | Weiler et al. | 92/165 PR |
| 4,423,597 | 1/1984 | Spielmann | 60/547.1 |

FOREIGN PATENT DOCUMENTS 2476575  8/1981  France .
62179 12/1948  Netherlands ...................... 60/547.1

*Primary Examiner*—Robert E. Garrett
*Assistant Examiner*—John M. Husar
*Attorney, Agent, or Firm*—Larry J. Palquta; Ken C. Decker

[57] ABSTRACT

The power-assistance servo-motor (8) supported on a first end (9) of the master cylinder (1) incorporates a moveable wall structure (13) connected to a valve body (20), located at the other axial end of the master cylinder (1), by two rigid conduits (26, 27) which extend radially on the outside of the pistons (4, 5) of the master cylinder (1) and which respectively make the valve (18) communicate with each of the chambers (13, 16) of the servo-motor (8), the conduits (26, 27) passing so as to slide in a leak-proof manner through the continuous rear wall (12) of the servo-motor (8).

8 Claims, 1 Drawing Figure

BRAKE-PRESSURE GENERATOR SYSTEM

The present invention relates to brake-pressure generator systems, more particularly for motor vehicles, of the type incorporating a master cylinder comprising a master-cylinder body containing at least one piston for at least one brake circuit, a power-assistance servo-motor, advantageously of the low-pressure type, which is associated with the master cylinder and is supported on a first axial end of the latter and which incorporates a housing divided on the inside into two chambers by a moveable wall structure forming a piston, a distribution valve means which is intended for controlling the servo-motor and is actuated by a push member intended to be connected to a brake pedal and which is coupled to the moveable wall structure, and at least one elongate traction member connecting the moveable wall sturcture of the servo-motor to the valve means and forming a fluid distribution passage for the latter.

Brake-pressure generator systems of the type mentioned above, with a power-assistance servo-motor cantilevered on one end of the master cylinder and imparting to the piston of the latter a power-assistance force via a traction member, have been developed to overcome the diadvantages of conventional systems in which the master cylinder is cantilevered on the servo-motor which interacts with the piston of the master cylinder by means of a thrust effect, especially eliminating the problems of the reaction forces which, in conventional systems, are transmitted via the walls of the housing of the servo-motor which consequently have to be given appropriate dimensions and made suitably rigid.

A brake-pressure generator system of the type defined above is described in European Patent Application No. EP-A-0045231. The brake-pressure generator systems, as described in this document, have the disadvantage that they use a push-rod for actuating the valve means and a traction member which both pass through the master-cylinder assembly centrally according to an arrangement which involves high production and assembly costs to ensure that the system is suitably reliable.

The object of the present invention is to propose a brake-pressure generator system of the type mentioned above, which has a simplified structure, especially as regards the servo-motor, and has reduced production costs and which especially makes it possible to use conventional master-cylinder components.

Another object of the present invention is to propose a brake-pressure generator system, the servo-motor of which presents the best possible active piston surface.

For this purpose, according to a feature of the invention, the control valve means of the servo-motor is arranged on the axial side of the master cylinder opposite the said first end and incorporates a valve body which is displaceable axially in relation to the master-cylinder body and which is connected to the moveable wall structure of the servo-motor by at least one pair of rigid conduits which respectively make the valve means communicate with each of the two chambers of the servo-motor.

According to a more particular feature of the invention, the rigid conduits, each advantageously consisting of a tube, extend radially on the outside of the piston of the master cylinder.

According to another feature of the invention, the housing of the servo-motor incorporates a continuous moveable wall structure in the form of a disc, that is to say of non-annular shape, and a continuous rear wall incorporating means for fixing it to said first end of the master cylinder, the rigid conduits passing so as to slide in a leak-proof manner through this rear wall of the servo-motor.

Other features and advantages of the present invention will emerge from the following description of a particular embodiment given as an illustration but in no way limiting, the description referring to the attached drawing in which:

FIG. 1 shows, in longitudinal section, a brake-pressure generator system according to the invention.

In the following description, the terms "front" and "rear" refer respectively to the left-hand and right-hand sides of FIG. 1, thereby observing the general oreintation of a vehicle equipped with a brake-pressure generator system according to the invention.

The system according to the invention comprises, in general terms, a master cylinder 1 incorporating a body 2 of general cylindrical shape, provided on the inside with an axial bore 3 in which there slides in a way known per se at least one master-cylinder piston 4, typically two pistons 4 and 5 for two brake circuits connected to orifices 6 and 7 opening into the chambers affected by the pistons 4 and 5. A power-assistance servo-motor, designated as a whole by reference numeral 8, is cantilevered on a closed axial end 9 of the body 2 of the master cylinder 1, the latter incorporating means, such as a collar or lugs 90, for attaching the system as a whole on a stationary wall 10 of a motor vehicle, most of the master cylinder 1 and the servo-motor 8 thus typically extending into the engine compartment of the motor vehicle.

The servo-motor 8 incorporates a housing formed by joining together peripherally a front shell 11 and a rear shell 12 which thereby define on the inside an enclosed space divided, by an axially moveable wall structure forming a piston 13, into a front chamber or low-pressure chamber 14, connected permanently by means of an end piece 15 to a vacuum source of the vehicle, and a rear chamber or working chamber 16, the moveable wall structure 13 being stressed in the dirction of the rear shell 12 by a spring 17 bearing on the front shell 11.

According to the invention, the brake-pressure generator system incorporates a three-way distribution valve means 18 of conventional type, as described in particular with reference to FIG. 1 of French Patent Application No. A-2499923 in the Applicant's name, which is controlled by a push-rod 19 intended to be connected to a brake pedal (not shown) of the vehicle so as to establish communication between the rear chamber 16 and the front chamber 14 selectively or with the atmosphere. According to the invention, the valve means 18 is arranged in a valve body 20 which is made, for example, of plastic, and which incorporates a rear part of reduced diameter 21, in which the rod 19 extends and in which are located the filter elements 22 for the passage providing communication between the valve means 18 and the atmosphere, and a front part of widened diameter 23 which defines on the inside a first passage 24 and a second passage 25 for communication between the chambers of the valve means 18 and respectively the front low-pressure chamber 14 and the rear working chamber 16. According to the invention, the valve body 20 is connected to the moveable wall structure 13 by a first rigid conduit 26 and by a second rigid conduit 27 in the form of hollow tubes sliding in a non-leak-proof manner in axial orifices 260, 260' and 270, 270' made in parts of annular collars 30 and 31 formed at the respective axial ends of the body 2 of the master cylinder 1. More specifically, each conduit 26 or 27 consists of a tube incorporating an end which is engaged in an axial orifice in the part of widened diameter 23 of the valve body 20 and communicating respectively with the corresponding passage 24 or 25. In the embodiment illustrated, each tube incorporates a relatively thin end accommodated in the said passage provided with a sealing gasket 32, and the region immediately adjacent to this relatively thin end is threaded so as to receive a nut 33 which bears against the annular front end of the valve body 20, the nuts being held against this end by a bearing washer 34 and a cap 35 screwed on the threaded periphery of the part 23 of the valve body 20, the cap incorporating an inner annular shoulder 36 interacting with the bearing washer 34. It will be noted that the end of the tube 27 is shaped so as to retain radially the stop key 37 which is intended for the plunger 38 of the valve means 18 and which is located in the passage 25.

In the embodiment illustrated, the rear shell 12 of the housing of the servo-motor 8 takes the form of a solid or continuous disc, the central region of which bears against the plane front face of the end 9 of the body 2 of the master cylinder 1 and has projections 120 which extend axially outwards and in which radial extensions of the end collar 30 of the body 2 of the master cylinder 1 are received and locked by means of a washer 39. Alternatively, the rear wall 12 can be attached to the master cylinder by means of radial studs which pass through the projections 120 and are received in corresponding radial orifices in the collar 30, or in an assembly of the bayonet type. According to the invention, the tubes 26 and 27 pass respectively through axial orifices 261 and 271 formed in the rear wall 12 opposite the orifices 260 and 270, annular sealing gaskets 40 being provided in these orifices 261 and 271. The ends of the tubes 26 and 27 opposite the valve body 20 are received and crimped in orifices 262 and 272 respectively which are formed in the plate 41 constituting, together with an elastomeric diaphragm 42, the moveable wall structure 13. The tube 26 permanently communicates freely with the front low-pressure chamber 14, while the tube 27 is isolated from the latter by a crimped shut-off disc 43, this tube 27 having, in its wall, orifices 44 between the crimped end on the moveable wall structure 13 and the orifice 271 in the rear wall 12, so as to establish permanent communication with the rear working chamber 16.

By means of such an arrangement, the rear valve body 20 is associated in terms of its displacement with the moveable wall structure 13 by means of the tubes 26 and 27 which respectively establish communication between the valve means 18 and the chambers 14 and 16 respectively, these tubes extending radially on the outside of the main body part of the master cylinder 1, the tubes being protected, at the level of the master cylinder, by a cylindrical hood 45 mounted between the collars 30 and 31 of the body 2 of the master cylinder 1, and between the valve body 20 and the master cylinder 1 by means of a bellows 46, the ends of which are fitted on the cap 35 and the adjacent end of the body 2 of the master cylinder 1. In the embodiment illustrated, the primary piston 4 of the master cylinder 1 incorporates a rear tubular extension 47 having a rear cup 48 forming a seat for a reaction disc 49 made of elastomeric material, which interacts with the valve body 20 and centrally with the plunger 38, the bearing washer 34 also forming an axial-retention stop for the cup 48.

According to a feature of the invention, since the connection between the valve body 20 and the moveable wall structure 13 is made solely by means of the sliding tubes 26 and 27, this moveable wall structure 13 can take the form of a non-annular continuous disc, just like the rear wall 12 of the servo-motor housing, thus presenting, between the two chambers 14 and 16, the best possible piston surface and consequently the best possible power-assistance force.

Although the present invention has been described in relation to a particular embodiment, it is not limited thereby, but is on the contrary capable of modifications and alternative forms which will appear to a person skilled in the art.

I claim:

1. A brake-pressure generator system, comprising a master cylinder including a master cylinder body containing at least one piston for at least one brake circuit, a power-assistance servo-motor associated with the master cylinder and supported on a first axial end of the master cylinder and which incorporates a housing divided internally into two chambers by a movable wall structure forming a piston, and distribution valve means for controlling the servo-motor and actuable by a controlled push member, the distribution valve means comprising a valve body connected to said movable wall structure, wherein said valve means is arranged on an axial end of the master cylinder opposite said first axial end and said valve body is axially displacable and connected to said movable wall structure by at least one pair of rigid elongated conduits which respecitvely make the valve means communicate with each of the two chambers of the servo-motor, and each conduit having one end fastened to said movable wall structure.

2. The system according to claim 1, wherein the conduits extend radially on the outside of the piston of the master cylinder.

3. The system according to claim 1, wherein the master-cylinder body incorporates means for attaching the system to a fixed structure.

4. The system according to claim 1, wherein the housing incorporates a continuous moveable wall structure and a continuous rear wall having means for fixing the rear wall to said first axial end of the master-cylinder body, the rigid elongated conduits sliding in leak-proof manner through the rear wall.

5. The system according to claim 4, wherein the master-cylinder body incorporates means for sliding guidance of the conduits.

6. The system according to claim 1, wherein the valve means includes a reaction member.

7. The system according to claim 1, wherein said rigid elongated conduits each consist of a tube section.

8. The system according to claim 2, wherein said rigid elongated conduits slidingly extend through an enlarged portion of said master-cylinder body, the end portion including means for mounting the system on a stationary wall.

* * * * *